June 28, 1966  J. E. BLYTHE  3,258,386
THERMOSEALING DEVICE
Filed Jan. 30, 1963

INVENTOR
JAMES E. BLYTHE
BY E. Janet Berry
ATTORNEY

United States Patent Office
3,258,386
Patented June 28, 1966

3,258,386
THERMOSEALING DEVICE
James E. Blythe, Pittsford, N.Y., assignor to National Distillers and Chemical Corporation, New York, N.Y., a corporation of Virginia
Filed Jan. 30, 1963, Ser. No. 255,011
5 Claims. (Cl. 156—583)

This invention relates generally to the sealing of thermoplastic films and to novel sealing devices therefor whereby effective seals, having peelable characteristics or otherwise, may be produced through two or more layers of such films.

The invention is particularly directed to the sealing of thermoplastic films including polyolefins, specifically oriented films, as well as oriented and non-oriented polystyrenes, polyesters, polyvinyl chlorides (e.g. Reynolon), and is concerned especially with the sealing of biaxially oriented polypropylene films wherein unusual and unexpected problems are presented inherently.

It is well known in prior art practices to produce satisfactory seals in thermoplastic films through the application of heat under carefully controlled conditions, with and without the application of pressure. In this manner, seals of permanent characteristics may be produced in such films as polyethylene without particular difficulties, although shrinking and distortion may result. Suitable precautions must be taken, as to conditions of temperature, pressure and dwell time, and, it is highly desirable that the film be protected from direct contact with the metallic sealing device through utilization of a suitable protective cover such as "Teflon," impregnated glass cloth, or the like. However, peelable seals, whereby the package may be opened without destruction of the sealed film cannot be produced in any way even by this method and it is presently unknown in the art to produce in a commercially acceptable manner either welded or peelable heat seals on an oriented polyolefin film. In the production of seals under present practice, and this is true especially with oriented films, actual melting and fusion takes place at the point of seal, and ready rupture occurs in connection with any attempt to separate the sealed surfaces.

With respect to biaxially oriented polypropylene films, one layer thereof cannot be sealed to another except where the sealer is externally covered, as suggested hereabove, and even under such conditions normal sealing practices are ineffective since application of heat results in random disorientation of the molecules, causing excessive shrinking and tearing of film. Efforts to overcome these problems through use of a coating applied to the film greatly increases its cost. Heat modulating coverings on the sealing devices, have met with only partial success.

A substantial measure of success has been met in this art by employing sealing surfaces which are constituted by a plurality of spaced points or sealing areas and, in the use thereof, actual sealing is accomplished only where such points contact the film and the spacing is such as to provide unsealed areas which function to some extent in the controlling of film distortion arising through shrinkage. It is with improvements in sealing devices of this character that the present invention is particularly concerned.

Thus, it is a major purpose of the present invention to provide novel sealing devices for the sealing of thermoplastic films, including particularly the oriented polypropylene whereby effective seals may be produced, having peelable or permanent characteristics, without requiring the use of expensive coatings on the film.

It is a further object of the invention to provide novel seals in thermoplastic films such seals having peelable or permanent characteristics as desired.

It is a still further object of the present invention to provide a novel sealing method whereby packages may be effectively sealed in molecularly oriented thermoplastic film wrappers without the necessity of any application of positive pressure upon the film surface being sealed, the weight of the package or pressure exerted during a continuous or semi-continuous process as the article is advanced through automatic sealing apparatus being sufficient to provide surface contact between layers of film and insuring the effective sealing thereof, whereby peelable seals are produced.

It is a still further object of the invention to effect a seal across a limited area of thermoplastic film, and including more specifically oriented polypropylene film, said area consisting of two layers of film and a single layer thereof without injury to the single layer, including excessive shrinkage, burning through or the like.

Further objects and advantages of the invention will be readily apparent from the following description taken in conjunction with the accompanying drawing wherein.

Figure 5:
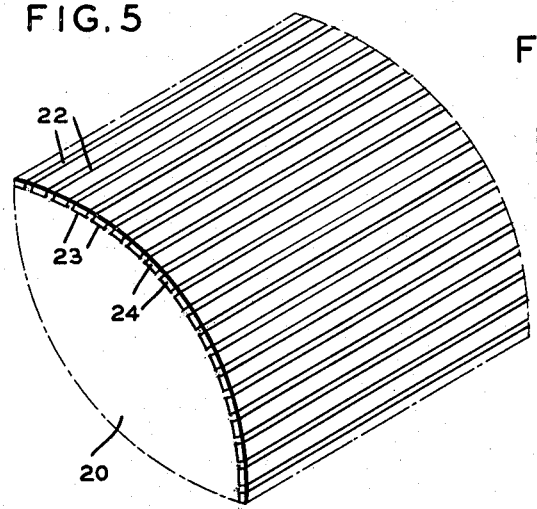
Figure 6:
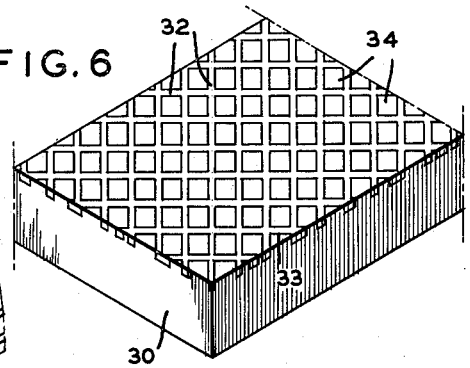

FIGURE 5 is a fragmentary perspective view of a portion of a cylindrical sealer intended for rotative movement with respect to the film surfaces being sealed and constructed in accordance with the present invention, the sealing areas being constituted by closely spaced knife-like lines disposed in parallel relationship; and FIGURE 6 is a fragmentary perspective view of a portion of a flat or bar-type sealer also constructed in accordance with the present invention and having a multi-line sealing surface, the lines thereof being disposed in crossed relationship.

Prior art practices have long undertaken the sealing of thermoplastic films through application of heat and pressure, sealing being accomplished more or less continuously over the entire area where two or more layers of film were to be united. Various sealing devices, both manual and automatic, have been used for such purposes and these have included heated sealing surfaces of substantial extent which were applied to the film areas to be united. More particularly, the sealing of uncoated biaxially oriented polypropylene film to obtain a good "peelable" seal without resorting to special coatings or adhesives has been recognized as a problem in the packaging industry. Attempts to heat seal biaxially oriented film usually have resulted in excessive shrinking and tearing of the film.

It has been discovered that continuous or extensive sealing surfaces are not required for such purposes. On the contrary, sealing elements which provide a plurality of closely spaced and relatively small sealing surfaces or areas may be employed to produce highly efficient sealed surfaces which may or may not have peelable characteristics. In connection with producing seals of this character, particular care must be exercised under conditions where the film is moved across a stationary multipoint sealing surface since during such passage the film is at sealing temperature and thus without much film strength.

The present invention solves this and related problems through the provision of sealing devices, both stationary and otherwise, which have entirely smooth contact surfaces, the multipoint sealing areas being exposed through such surfaces so as to contact film passing thereover or contacted thereby. Several illustrative sealing surfaces and sealers have been shown in the drawing, suitable for both manual and automatic operation.

One field of particular commercial importance may be found in the wrapping of articles or merchandise such as loaves of bread, sliced or otherwise, where specifically a longitudinal or bottom seal, as well as end seals, are required and for a commercially acceptable package it is of prime importance that the end seals be readily peelable so that repeated access may be had to the package contents for the removal of a portion thereof with the wrapper remaining substantially intact so that it may be closed after each opening and the contents protected against undue drying out and other undesirable effects caused by exposure to air. It is also desirable to have a welded bottom seal that will not separate when the end of the package is opened.

As a specific embodiment of the present invention, particular reference being had to FIGURES 1 through 4 of the drawing, a sealing element 10, which may be part of a flat bar or other structure, is provided with a plurality of closely spaced rectangular pyramids 11 truncated as indicated at 12 to provide a flat sealing surface. While dimensions are not viewed as of extreme criticality, excellent results have been obtained where the pyramids were spaced apart approximately one thirty-second of an inch ($\frac{1}{32}$") from point to point and the sides sloped at an angle of approximately 30° from the vertical. This is the general order of magnitude pyramid size which has been found to be particularly desirable.

Rectangular pyramids of this character, spaced as stated and truncated to provide a flat top measuring about .005" square will have a depth of approximately .037". It will be understood however that, within practical limits, differing pyramidal and conical forms may be utilized with equally satisfactory results. Further, the present inventive concept may be carried to other forms of multipoint sealing surfaces with equal facility as has been illustrated and will be described in detail hereafter.

Varying the spacing of the sealing projections, and varying the size of the flat tips thereof, will have a direct bearing on the actual area which is sealed. The multipoint sealing contemplated is produced through what may be termed as a micro-spotwelding technique in which up to 2½% of the surface is actually sealed. However, highly efficient seals have been produced, all readily peelable, where from ½% to 10% of the surface was sealed. These figures are to be viewed as purely illustrative and in no manner limiting to the scope of the invention.

Any material which will function as a heat conductor, and can be fabricated to produce sealing projections, may be employed. These can be metallic and may include, among others, stainless steel, brass, aluminum, and clad materials.

As indicated hereabove, sealing temperatures will vary in accordance with the thermoplastic material employed, lower temperatures being required for polyethylene than for polypropylene. Minimum temperatures will range from 200° F. for polyethylene and 235° F. for polypropylene to up to 1500° F. Below 200° F. sealing cannot be accomplished even with infinite residence time. Where temperatures exceeding 1500° F. have been accepted, burn-through occurred immediately upon contact.

A practical range as to residence time has been found to be from 0.1 up to 8 to 10 seconds; thus, residence time or dwell interval are inversely related to temperature for any particular film.

Continuous webs of thermoplastic material may have the overlapping edges thereof sealed with devices constructed in accordance with the present invention. Efficient seals, which are peelable, are obtainable without material film distortion or shrinkage. Packaging speeds up to 1000 feet per minute are entirely feasible.

Further, multipoint sealing may be accomplished through a multiplicity of layers of film, this being variable in accordance with the type of film, residence time, and temperatures employed. As a single example, with oriented polypropylene film having a gauge of .6–.7 mil, 8 to 10 layers may be sealed at a speed of 20 feet per minute on a roll, the sealing temperatures being within the range of 450° F. to 600° F. Moreover, with multipoint sealing as taught herein, no positive pressure is required, frictional contact, guiding pressure or weight of the product per se with a wrapped package passing over a sealing element being all that is required.

As stated hereabove, under prior art practices severe problems have arisen when the film is moved across a multipoint sealing surface since at that moment, while sealing or micro-spotwelding is being accomplished, there is a tendency of the film which approaches the molten state at the immediate point of seal to catch upon the points of the sealer offering resistance to some degree against normal forward progress and resulting in the impartation of irregularities to the sealed surface. This specific problem, among others, has been obviated by the present invention.

Figure 1:
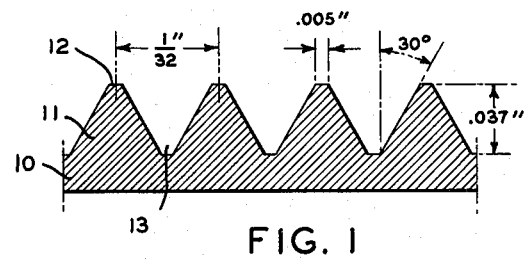
FIGURE 1 is a fragmentary sectional view, on a greatly enlarged scale, illustrating a specific multipoint sealing surface of truncated rectangular pyramidal configuration.
Figure 2:
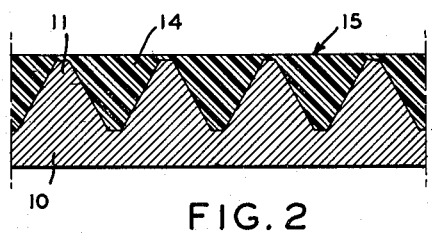
FIGURE 2 is a fragmentary sectional view, identical to FIGURE 1 and illustrating a plastic filler with poor thermal conductivity properties applied to the multipoint sealing surface.
Figure 3:
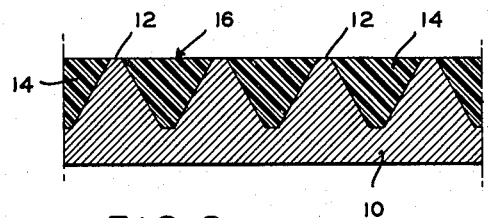
FIGURE 3 is a fragmentary sectional view identical to FIGURE 2 and illustrating the extending surface of the filler removed, as by grinding or the like, whereby the upper surfaces only of the pyramidal sealing points are exposed.
Figure 4:
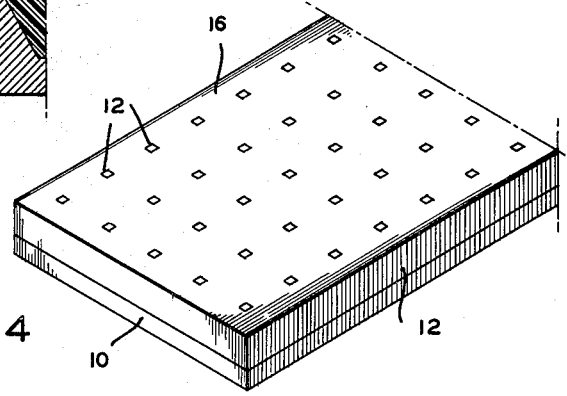
FIGURE 4 is a fragmentary perspective view of a portion of a flat or bar-type sealer having a multipoint sealing surface constructed in accordance with the present invention.

In the multipoint sealer of FIGURE 1, interconnecting spaces or voids 13 are provided between the sealing pyramids 11 and the sealer is coated as indicated at 14 with a suitable material having low thermal conductivity whereby these voids are completely filled, the surface 15 of the filler 14 lying in a plane above that of the sealing points 12 of the sealing pyramids. Materials such as Teflon or Rulon are readily available commercially and are particularly suitable for use as a filler for present purposes.

The surface of the filler is then ground and/or polished so as to provide an entirely smooth and continuous surface 16 wherein only the points 12 of the sealing pyramids are exposed and flush therewith. This is clearly illustrated in section in FIGURE 3 of the drawing and in perspective in FIGURE 4 thereof.

The provision in this manner of a smooth and highly polished multipoint sealing surface, where only the sealing points are exposed, results in a smoothing out of the heat gradient between sealed and unsealed areas, eliminates tendency toward either shrinkage or distortion, and provides a uniformly sealed surface having peelable characteristics and without any of the disadvantages or objectionable features heretofore found troublesome particularly in connection with the sealing of biaxially oriented polypropylene films.

The present inventive concept may be applied or incorporated with equal facility in other types of sealers or sealing surfaces. Thus, as shown in FIGURE 5, a cylindrical sealing element 20 may be provided, spaced sealing areas thereof being constituted by relatively narrow bars or knife-like edges 22 disposed in parallel relationship. The voids or spaces 23 between adjacent sealing edges are filled with a suitable material 24 of low thermal conductivity which then is ground down or polished to provide a smooth and continuous peripheral surface flush with the exposed surfaces of said sealing edges.

The modified form of sealer 30 illustrated in FIGURE 6 of the drawings also is a line type sealer, the sealing edges 32 thereof being disposed in cross-cross relationship leaving voids 33 therebetween. These voids are filled with a suitable material 34 of low thermal conductivity which then is ground down and/or polished to provide a smooth and continuous surface flush with the exposed sealing edges and similar to the surface 16 of the sealing element illustrated in FIGURE 4.

The rotary sealing element 20 of FIGURE 5 will provide a sealed area having a ribbed appearance while the flat sealer 30 of FIGURE 6 will provide a sealed area having a waffle-like appearance with closely spaced unsealed areas, each of which has a sealed edge on all sides thereof.

It will be understood that the angular relationship of the crossed sealing edges 32 may be varied as desired and that within wide limits any other form of multipoint sealing surface may be utilized it only being necessary that the voids between the sealing points or areas be filled with an appropriate material having adequately lower thermal conductivity and that surplus filler material be removed by grinding, polishing, or the like, to provide a continuous and smooth surface which is flush with the outer surfaces of the sealing points or areas.

An important advantage of the sealers disclosed herein and contemplated under applicant's inventive teachings, is that actual sealing time need not be held to be critical. This is in diametric opposition to established practices with conventional sealers where sealing time is a most critical variable.

Suitable means (not shown) may be provided for heating the sealing members and a preferred method is the utilization of a controlled electrical element which is inserted into the sealer or is in intimate contact therewith.

It has been found that films which have been sealed with devices constructed in accordance with the present invention exhibit increased tear strength and stiffness and this is particularly true in connection with oriented polypropylene films. This is of particular importance since one of the disadvantages of molecularly oriented polyolefin films is that these possess relatively low tear strength. While it may be relatively difficult to initiate a tear in such films, once a tear is started but little force is required to continue the tear.

The above described multipoint sealing process creates a multiplicity of relatively minute spots on the film which have been melted or fused to such a degree that, once encountered, these will stop a tear and, in order to continue, the tear must again be started. Since initiating a tear, as compared to continuing a tear already started, is relatively difficult, this "starting and stopping" of a tear results in the necessity for imparting an overall greater force in order to tear completely through a sheet of film. Thus, there has been achieved a substantially greater tear strength in the sealed films and this is extremely important in numerous packaging operations by reason of the possibility of initiating a tear upon opening a package which, where the packing film has relatively low tear strength, would "run" around the package and release the entire contents thereof.

Further, the production of a multiplicity of melted spots in a sealed film area results in a substantial stiffening of the film. This is occasioned by the fact that the melting process creates minute raised portions in the area surrounding the fused spot and these areas act as stiffeners which resist bending of the film in the immediate location thereof. This increased stiffness is highly desirable in packaging operations where reliance is had upon the stiffness of the film for feeding into the packaging machine. A typical example thereof is in connection with packaging machines where the film is pushed into position rather than pulled.

An examination of film surfaces which have been sealed in accordance with the present invention fails to disclose any perceptible shrinkage or distortion at the sealed areas. This phenomenon is believed to result from the fact that only a fraction of the film comes into actual contact with the heated multipoint sealing surface while the major portion of the film, which has contacted not the sealing points or surfaces but only the smooth and flush contiguous areas therebetween, remains undisturbed.

Another unique feature of the present invention is that sealing of oriented polypropylene films can be accomplished on a stationary (non-moving) surface where push-on-stop-push-off techniques are employed. Since melting of the film occurs at the point of seal, there is a great tendency for the film to catch upon the exposed sealing surfaces when a package, or the like, is pushed or moved off of a stationary sealer. With the present invention, where the voids between the sealing points or areas is filled with suitable material, the sealer is polished to provide a continuous and smooth surface, this inadequacy in prior art devices is obviated. Smooth surfaces of the character contemplated are of particular importance in connection with many wrapping machines where the techniques referred to hereabove are essential including, as a single example, bread wrapping machines.

It will be obvious to those skilled in this art that various changes may be made in the invention without departing from the spirit and scope thereof and therefore the invention is not considered limited by that which is shown in the drawing and described in the specification and reference is had to the accompanying claims for summaries of the essential features of the invention and novel features of construction and combinations of parts for all of which protection is desired.

What is claimed is:

1. A thermosealing device for producing peelable seals through two or more layers of thermoplastic film, said device including a sealing surface consisting of a plurality of relatively closely spaced projections, each of said projections being in the form of a pyramid having an enlarged base portion, upwardly inclined side walls and a flat upper extremity of sharply reduced area, the height of each pyramid being on the order of .037", the flat upper extremities being on the order of .005" square, said pyramids being spaced apart on the order of 1/32" from center to center of adjacent flat upper extremities and the side walls of each pyramid sloping upwardly at an angle of approximately 30° from the vertical the spaces between said projections being filled with a material of substantially lower thermal conductivity than that of said projections, said filler material constituting a continuous smooth surface flush with the upper extremities of said spaced projections.

2. A thermosealing device as set forth in claim 1 where said filler material is a rigid-setting plastic susceptible of retaining a smooth and polished surface and having a substantially higher melting point than any temperature to which said device may be heated.

3. A thermosealing device as set forth in claim 1 where said sealer is in the form of a relatively flat bar.

4. A thermosealing device as set forth in claim 1 where said sealer is cylindrical.

5. A thermosealing device as set forth in claim 1 including selectively adjustable means for heating the flush surfaces of said projections to sealing temperatures.

References Cited by the Examiner

UNITED STATES PATENTS

| | | | |
|---|---|---|---|
| 2,730,161 | 1/1956 | Langer | 156—292 |
| 3,017,315 | 1/1962 | Doyle | 156—583 |

EARL M. BERGERT, *Primary Examiner.*

DOUGLAS J. DRUMMOND, *Assistant Examiner.*